US006629211B2

(12) United States Patent
McKnight et al.

(10) Patent No.: US 6,629,211 B2
(45) Date of Patent: Sep. 30, 2003

(54) METHOD AND SYSTEM FOR IMPROVING RAID CONTROLLER PERFORMANCE THROUGH ADAPTIVE WRITE BACK/WRITE THROUGH CACHING

(75) Inventors: Gregory Joseph McKnight, Chapel Hill, NC (US); Linda Ann Riedle, Apex, NC (US); Charles Thorpe Stephan, Knightdale, NC (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 09/838,788

(22) Filed: Apr. 20, 2001

(65) Prior Publication Data

US 2002/0156972 A1 Oct. 24, 2002

(51) Int. Cl.[7] .............................................. G06F 12/00
(52) U.S. Cl. ........................ 711/141; 142/143; 142/113
(58) Field of Search ................................ 711/114, 141, 711/142, 143, 113

(56) References Cited

U.S. PATENT DOCUMENTS

| | | | |
|---|---|---|---|
| 5,359,723 A | 10/1994 | Mathews et al. | 395/425 |
| 5,561,779 A | 10/1996 | Jackson et al. | 395/449 |
| 5,829,027 A | 10/1998 | Goodrum | 711/122 |
| 5,860,091 A | 1/1999 | DeKoning et al. | 711/114 |
| 5,915,129 A * | 6/1999 | Slivka et al. | 710/68 |
| 5,950,227 A | 9/1999 | Kulkarni | 711/143 |
| 6,192,432 B1 * | 2/2001 | Slivka et al. | 710/68 |
| 6,378,038 B1 * | 4/2002 | Richardson et al. | 711/114 |
| 6,427,184 B1 * | 7/2002 | Kaneko et al. | 711/4 |

* cited by examiner

*Primary Examiner*—Hiep T. Nguyen
(74) *Attorney, Agent, or Firm*—J. Bruce Schelkopf; Sawyer Law Group

(57) ABSTRACT

A method and system for accessing data in a redundant array of inexpensive disks (RAID) subsystem is disclosed. The RAID subsystem includes a RAID controller having a cache and a plurality of disks. The method and system include utilizing the cache in a write back mode if the RAID subsystem is lightly loaded. In write back mode, the data is written to the cache prior to storing the data on at least one disk of the plurality of disks or prior to outputting the data from the RAID subsystem. The method and system also include utilizing the cache in a write through mode if the RAID subsystem is heavily loaded. In the write through mode, the data is written directly to at least one disk of the plurality of disks and, in a preferred embodiment, at the same time written to any cache buffer. Thus, data is written to the disks without the delay associated with managing a full cache when in write back mode required to flush an existing cache buffer to make a free buffer available.

10 Claims, 2 Drawing Sheets

METHOD AND SYSTEM FOR IMPROVING RAID CONTROLLER PERFORMANCE THROUGH ADAPTIVE WRITE BACK/ WRITE THROUGH CACHING

FIELD OF THE INVENTION

The present invention relates to computer systems, and more particularly to a method and system for improving performance of a RAID controller through adaptive write back/write through caching.

BACKGROUND OF THE INVENTION

Redundant array of inexpensive disks ("RAID") technology is increasingly used in computer systems to provide increased capacity and performance. FIG. 1 depicts a conventional RAID subsystem 20 that is coupled to a computer system 10. The computer system 10 is typically a server which allows a large number of users to access the RAID subsystem 20. The RAID subsystem 20 includes a RAID controller 22 having a cache 24. The RAID subsystem 20 also includes disks 26, 28, 30 and 32. For clarity, only these portions of the RAID subsystem 20 are depicted.

The RAID controller 22 provides an interface between the RAID subsystem 20 and the computer system 10. Thus, the RAID controller 22 includes the hardware that interfaces between the computer system 10 and the disks 26, 28, 30 and 32 and allows the disks 26, 28, 30 and 32 to appear to the computer system 10 as a single disk. The RAID controller 22 also includes the cache 24. The cache is used to improve input to and output from the RAID subsystem 20 by reducing the latency and increasing throughput. This is possible because cache accesses are typically faster than accesses of a disk 26, 28, 30 or 32. When data is to be output from the RAID subsystem 20, data can be written from the disks 26, 28, 30 and 32 to the cache 24. The data can then be output from the cache 24, typically at a higher rate than data can be written from the disks 26, 28, 30 and 32. Performance is improved when data written to the cache by the disk is repeatedly accessed. When this happens disk I/O does not occur and performance is improved. When data is to be written to the RAID subsystem 20, data can be input to the cache 24. The data can then be asynchronously written to the disks 26, 28, 30 and 32, typically at a lower rate than data is written to the cache 24.

Typically, the cache 24 can be in one of two configurations. The cache 24 can be configured so that data stored in the cache is written to the RAID subsystem 20 at the same time it is written to the cache. This configuration is known as write through. In write through mode, data written to the RAID subsystem 20 is written to both the cache 24 and to the disks 26, 28, 30 and 32. This may improve performance because if data in the cache 24 is reused it can be retrieved from the cache 24 without the delay of a disk access. In the case of write through even though data is written to the cache 24 the operation does not complete until the data is actually written to a disk 26, 28, 30, or 32. Alternatively, the cache 24 can be placed in write back mode. In write back, data is written directly to the cache 24 without requiring data be immediately written to the disks 26, 28, 30 or 32. This allows a faster completion of the write operation because a write operation to the cache 24 is much faster than a write operation to the disks 26, 28, 30 or 32. Thus, the operation need not wait for the disk write to complete. At a later time, the modified data in the cache 24 is written from the cache 24 to the disks 26, 28, 30 and 32 of the RAID subsystem 20.

In general, the cache 24 is placed in write back mode. Thus, the cache 24 is used to store data that is written to the disks 26, 28, 30 and 32 without first writing the data to disk. In write back mode the cache is also used to store data that is read from the disk. In many instances, write back mode improves the performance of the RAID subsystem 20, as described above. However, one of ordinary skill in the art will readily recognize that the write back mode may not provide optimal performance in some instances. In particular, when the cache 24 starts to become full, an I/O operation may stall until a portion of the cache 24 is flushed. As a result, performance of the RAID subsystem 20 suffers because any outstanding disk write command must wait for a cache buffer management process in the RAID controller 22 to flush a modified buffer (not explicitly shown in FIG. 1) and make the cache 24 available for the new write operation. Write through operations also require a buffer of the cache 24 to store the write data, but the buffer management does not have to flush modified data to free a buffer of the cache 24 because all buffer data is already written to the disk 26, 28, 30 and 32. In this case buffer management can simply overwrite any existing buffer in the cache 24 to make space for an outstanding write command. In this case, the write through operation may complete without delay.

One solution to performance problems due to the cache 24 becoming full is to make the cache 24 larger. A larger cache 24 will become full less frequently. As a result, it was theorized that performance of the RAID subsystem 20 should improve. However, the increase in the size of the memory of the cache 24 often has the opposite result. An increase in the size of the memory of the cache 24 can actually degrade the performance of the RAID subsystem 20. This occurs because if a larger cache becomes full it will require more Raid Controller 22 buffer management-processing overhead to manage and free buffers. This buffer management overhead degrades performance. This condition occurs whenever the workload consists of a sustained I/O rate that is greater than the aggregate capabilities of the RAID subsystem 20.

Accordingly, what is needed is a system and method for improving the performance of a RAID subsystem 20 that includes a cache 24. The present invention addresses such a need.

SUMMARY OF THE INVENTION

The present invention provides a method and system for accessing data in a redundant array of inexpensive disks (RAID) subsystem. The RAID subsystem includes a RAID controller having a cache and a plurality of disks. The method and system comprise utilizing the cache in a write back mode if the RAID subsystem is lightly loaded. In write back mode, the data is written to the cache prior to storing the data on at least one disk of the plurality of disks or prior to outputting the data from the RAID subsystem. The method and system also comprise utilizing the cache in a write through mode if the RAID subsystem is heavily loaded. In the write through mode, the data is written directly to at least one disk of the plurality of disks.

According to the system and method disclosed herein, the present invention provides a faster, more efficient mechanism for accessing data in a RAID subsystem.

DETAILED DESCRIPTION OF THE INVENTION

The present invention relates to an improvement in computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for accessing data in a redundant array of inexpensive disks (RAID) subsystem. The RAID subsystem includes a RAID controller having a cache and a plurality of disks. The method and system comprise utilizing the cache in a write back mode if the RAID subsystem is lightly loaded. In write back mode, the data is written to the cache prior to storing the data on at least one disk of the plurality of disks. The method and system also comprise utilizing the cache in a write through mode if the RAID subsystem is heavily loaded. In the write through mode, the data is written to at least one disk of the plurality of disks and, in a preferred embodiment, to the cache. In write through mode the write to the cache can be done without the overhead and delay of the RAID subsystem buffer management operation required to flush a modified buffer to make a free buffer available within the cache. In write through mode data is written to the cache by overwriting an existing buffer. This can be done because all cache buffers have already been written to the disk subsystem.

The present invention will be described in terms of a particular RAID subsystem. However, one of ordinary skill in the art will readily recognize that this method and system will operate effectively for other RAID subsystems having another number of disks and other components. The present invention is also described in the context of particular methods having certain steps. However, one of ordinary skill in the art will readily recognize that the present invention is consistent with methods having other and/or additional steps.

Figure 2:
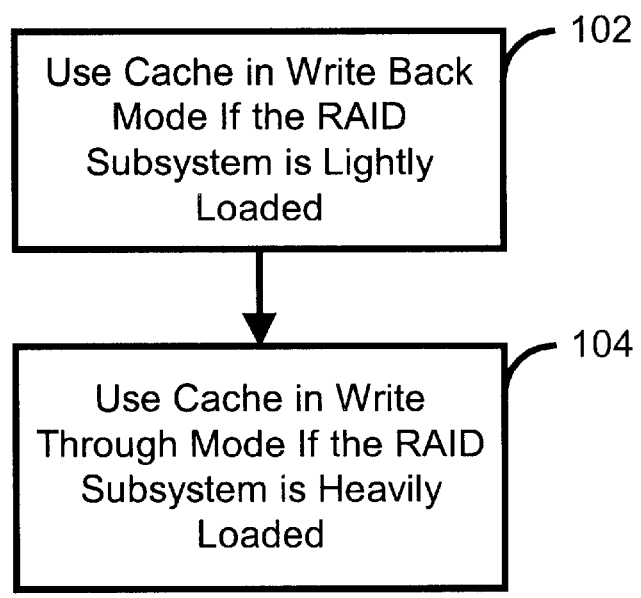
FIG. 2 is a high-level flow chart depicting one embodiment of a method for accessing data in accordance with the present invention.

To more particularly illustrate the method and system in accordance with the present invention, refer now to FIG. 2, depicting one embodiment of a method 100 in accordance with the present invention for accessing data in a RAID subsystem. The method 100 is preferably used with the RAID subsystem 20. Consequently, the method 100 will be described in conjunction with the RAID subsystem 20.

Figure 1:
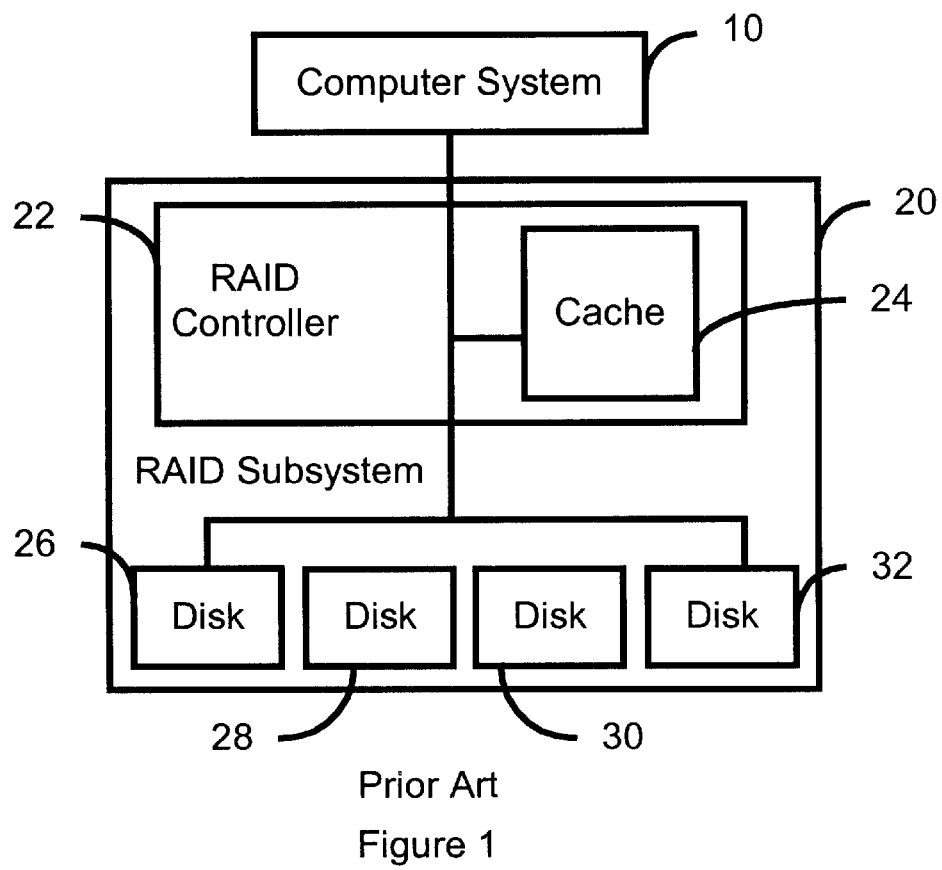
FIG. 1 is a block diagram of a RAID subsystem.

Referring to FIGS. 1 and 2 the cache 24 is used in a write back mode if the RAID subsystem 20 is determined to be lightly loaded, via step 102. In a preferred embodiment, the load on the RAID subsystem 20 is determined based on the occupancy of the cache 24. In one embodiment, if the occupancy of the cache 24 is below a particular threshold, then the cache 24 is considered to be lightly loaded. Otherwise, the RAID subsystem 20 is considered to be heavily loaded. The threshold used in characterizing the load on the RAID subsystem 20 could change depending on the application for which the RAID subsystem 20 is used. Preferably, the threshold is expressed in a percentage occupancy of the cache 24. Thus, the threshold might be when the cache 24 is eighty percent, one hundred or another percentage full. In an alternate embodiment, the load on the RAID subsystem 20 could be determined in another manner. In the write back mode, the cache 24 is utilized both when data is input to the RAID subsystem 20 and when data is output from the RAID subsystem 20. Thus, when the RAID subsystem 20 is lightly loaded, data being input from the computer system 10 is written to the cache 24, then asynchronously stored in the disks 26, 28, 30 and 32. In addition, when data is output from the RAID subsystem 20, the data is written from the disks 26, 28, 30 and 32 to the cache 24, then asynchronously output to the computer system 10 when the RAID subsystem 20 is lightly loaded. As a result, latency can be reduced and performance of the RAID subsystem 20 improved.

The cache 24 is used in write through mode if the RAID subsystem 20 is heavily loaded, via step 104. In a preferred embodiment, the write through mode writes both to the cache 24 and the disks 26, 28, 30 and 32. However, in another embodiment, the write through mode may merely write to the disks 26, 28, 30 and 32 without writing to the cache 24. As described above, in a preferred embodiment, the RAID subsystem 20 is considered heavily loaded if the cache 24 has an occupancy that is greater than or equal to a particular threshold. In another embodiment, the RAID subsystem 20 is considered heavily loaded if the cache 24 has an occupancy greater than the threshold, and lightly loaded otherwise. However, nothing prevents the use of another mechanism for determining the load on the RAID subsystem 20. In the write through mode, under heavy load, performance is improved because a the cache management process (not explicitly shown) can immediately overwrite any buffer of the cache 24 and quickly store data to both a buffer of the cache 34 and to the disks 26, 28, 30 and 32 of the RAID subsystem 20 to quickly complete the operation. Consequently, when data is to be stored on the disks 26, 28, 30 and 32, it is quickly written to both a cache buffer and directly to the disks 26, 28, 30 and 32, thereby bypassing the delay associated with waiting for a free buffer of the cache 24. This can be done because in write through mode all data in the buffers of the cache 24 are already stored on disk and can be immediately overwritten. When data is read from the disks 26, 28, 30 and 32, it is stored in the cache 24, then output to the computer system 10 where users can access it.

Thus, using the method 100, the RAID controller 22 adapts to the state of the RAID subsystem 20 by changing the mode of the cache 24 depending upon the load on the RAID subsystem 20. When the RAID subsystem 20 is lightly loaded, use of the write back mode improves performance over a write through mode. Thus, the latency is decreased and throughput increased for read and write operations. Using the write through mode of the cache 24 when the RAID subsystem 20 is heavily loaded improves performance of the RAID subsystem 20 over a write back mode. Thus, again, the latency is decreased and throughput increased. Consequently, the RAID subsystem 20 can operate efficiently over a range of loads.

Figure 3:
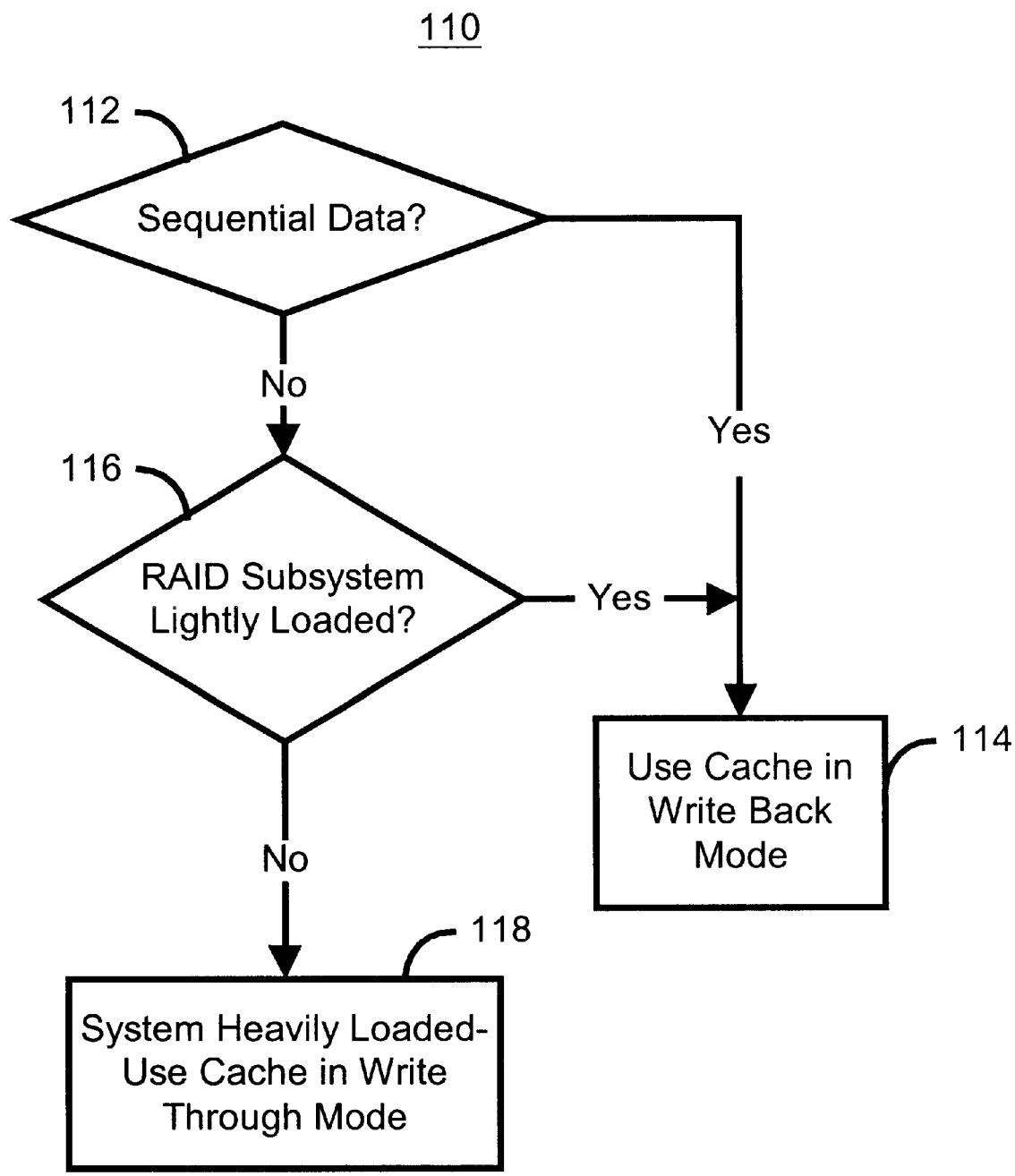
FIG. 3 is a more detailed flow chart depicting one embodiment of a method for accessing data in accordance with the present invention.

FIG. 3 depicts a more detailed flow chart of a preferred embodiment of a method 110 for accessing data using a RAID subsystem. The method 110 is preferably used in conjunction with the RAID subsystem 20. Consequently, the method 110 is described in conjunction with the RAID subsystem 20.

Referring to FIGS. 1 and 3, the method 110 preferably commences after a user has requested that data be input to or read from the RAID subsystem 20. It is determined whether the data involves sequential input or output operations, via step 112. For example, a video or audio clip involves sequential operations because the data is typically viewed or listened to in a particular sequence. Thus, the data is stored and accessed in this sequence. If it is determined that the data involves sequential operations, then the cache 24 is always used in the write back mode when accessing the data, via step 114. Thus, when sequential data is stored, the data will be written to the cache 24 first, then later stored in the disks 26, 28, 30 and 32. This improves performance because the RAID subsystem can perform larger write operations then the requested size by combining multiple operations into one disk operation. Similarly, when sequential data is read from the disks 26, 28, 30 and 32, the data is stored in the cache 24, then output to the computer system 10.

If it is determined that the data does not involve sequential operations, then it is determined whether the RAID subsystem 20 is lightly loaded, via step 116. In a preferred embodiment, step 116 includes determining whether the cache 24 has an occupancy that is less than a particular threshold. In other words, step 116 may include determining whether the cache has a particular amount of memory available. However, the load on the RAID subsystem 20 could be determined in another fashion. If the RAID subsystem 20 is lightly loaded, then the cache 24 is again used in write back mode for accessing the data, via step 114. Consequently, the data will be input to and output from the RAID subsystem 20 using the cache 24.

If it is determined that the RAID subsystem 20 is not lightly loaded, then the cache 24 is used in write through mode for accessing the data, via step 118. As described above, in write through mode, data are preferably written to both the cache 24 and the disks 26, 28, 30 and 32. However, in an alternate embodiment, data may be written to the disks 26, 28, 30 and 32 without writing to the cache 24. As a result of using write through mode, when the data is input to the RAID subsystem 20, data can be quickly written to any buffer of the cache 24 bypassing the management overhead and latency required for a buffer flush operation. Thus, the data will be written without delay directly through to the disk cache 24 and simultaneously to the disks 26, 28, 30 and 32. When the data is output from the RAID subsystem 20, the data will be read from the disks 26, 28, 30 and 32, stored in the cache 24, then output to the computer system 10.

Because write back mode is used when the RAID subsystem 20 is lightly loaded, while write through mode is generally used when the RAID subsystem 20 is heavily loaded, the method 110 has similar advantages to the method 100. Thus, performance of the RAID subsystem 20 is improved in both heavy and light loads. In addition, the method 110 takes into account the type of data being accessed. Sequential input and output operations are different in that data involving sequential operations typically benefits from use of the cache 24 regardless of the load on the RAID subsystem 20. Thus, write back mode is always used for this type of data to improve performance of the RAID subsystem 20. Consequently, the method 110 improves throughput for the RAID subsystem 20 adaptively based on the load on the RAID subsystem 20 as well as on the type of data being accessed.

A method and system has been disclosed for adaptively caching data in a RAID subsystem. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for accessing data in a redundant array of inexpensive disks (RAID) subsystem including a RAID controller having a cache and a plurality of disks, the method comprising the steps of:
   (a) utilizing the cache in a write back mode if the RAID subsystem is lightly loaded so that the data is written to the cache prior to storing the data on at least one disk of the plurality of disks or prior to outputting the data from the RAID subsystem, wherein the write back step
   (a) further includes the step of
   (a1) utilizing the cache in the write back mode if the cache has an occupancy that does not exceed a predetermined threshold; and
   (b) utilizing the cache in a write through mode if the RAID subsystem is heavily loaded so that the data is written directly to at least one disk of the plurality of disks.

2. The method of claim 1 wherein the cache utilizing step (b) further includes the step of:
   (b1) writing directly to at least one disk of the plurality of disks and to a buffer of the cache substantially simultaneously without the delay associated with flushing a buffer of the cache to disk to make a free buffer available.

3. The method of claim 1 wherein the cache utilizing step (a1) further includes the step of
   (a1i) utilizing the cache in the write back mode only if the occupancy of the cache is less than the predetermined threshold.

4. The method of claim 1 wherein the write through step (b) further includes the step of:
   (b1) utilizing the cache in the write through mode if the cache has the occupancy that is greater than a particular threshold.

5. The method of claim 1 further comprising the step of:
   (c) utilizing the cache in write back mode regardless of a load on the RAID subsystem if the data is to be sequentially accessed.

6. A redundant array of inexpensive disks ("RAID") subsystem comprising;
   a plurality of disks;
   a RAID controller coupled to the plurality of disks, the RAID controller including a cache, the RAID controller utilizing the cache in a write back mode if the RAID subsystem is lightly loaded so that the data is written to the cache prior to storing the data on at least one disk of the plurality of disks or prior to outputting the data from the RAID subsystem and utilizing the cache in a write through mode if the RAID subsystem is heavily loaded so that the data is written directly to at least one disk of the plurality of disks;
   wherein the RAID controller utilizes the cache in the write back mode if the cache has an occupancy that does not exceed a predetermined threshold.

7. The RAID subsystem of claim 6 wherein in write through mode, the data is written to the at least one disk of the plurality of disks and to a buffer of the cache substantially simultaneously without the delay associated with flushing the buffer of the cache to disk to make a free buffer available.

8. The RAID subsystem of claim 6 wherein the RAID controller utilizes the cache in the write back mode only if the occupancy of the cache is less than the predetermined threshold.

9. The RAID subsystem of claim 6 wherein the RAID controller utilizes the cache in the write through mode if the cache has the occupancy that is greater than a particular threshold.

10. The RAID subsystem of claim 6 wherein the RAID subsystem further utilizes the cache in write back mode regardless of a load on the RAID subsystem if the data is to be sequentially accessed.

* * * * *